United States Patent
Belisle et al.

(10) Patent No.: US 11,133,665 B2
(45) Date of Patent: Sep. 28, 2021

(54) DIRECT CURRENT OVER VOLTAGE MONITORING AND PROTECTION

(71) Applicant: HAMILTON SUNDSTRAND CORPORATION, Charlotte, NC (US)

(72) Inventors: Francis C. Belisle, Roscoe, IL (US); Jef William Good, German Valley, IL (US); George E. Wulf, Jr., Rockford, IL (US); Barry T. Drager, Rockford, IL (US); Kenneth C. Kramer, Byron, IL (US); Chad Lukan, Poplar Grove, IL (US); Kyle Elmer, Poplar Grove, IL (US); Steven M. Quirk, West Dundee, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 348 days.

(21) Appl. No.: 16/116,446

(22) Filed: Aug. 29, 2018

(65) Prior Publication Data
US 2020/0076184 A1 Mar. 5, 2020

(51) Int. Cl.
*H02H 7/26* (2006.01)
*H02H 9/04* (2006.01)

(52) U.S. Cl.
CPC ............ *H02H 7/268* (2013.01); *H02H 7/266* (2013.01); *H02H 9/045* (2013.01); *B64D 2221/00* (2013.01)

(58) Field of Classification Search
CPC ........ H02H 7/268; H02H 7/266; H02H 9/045; H02H 3/087; H02H 3/202
See application file for complete search history.

(56) References Cited

U.S. PATENT DOCUMENTS

| | | | |
|---|---|---|---|
| 3,480,834 A | 11/1969 | Billings | |
| 3,631,258 A | 12/1971 | Eisenstadt | |
| 4,706,151 A * | 11/1987 | Roberts | F02P 19/02 361/6 |
| 5,479,329 A | 12/1995 | Motonobu et al. | |
| 6,037,728 A * | 3/2000 | Petkovic | B60L 50/61 318/364 |
| 9,240,679 B2 | 1/2016 | Jung et al. | |

(Continued)

FOREIGN PATENT DOCUMENTS

DE 102017202536 A1 8/2018

OTHER PUBLICATIONS

European Search Report for European Application No. 19194132.7; dated Jan. 31, 2020, 7 pages.

*Primary Examiner* — Scott Bauer
(74) *Attorney, Agent, or Firm* — Cantor Colburn LLP

(57) ABSTRACT

A direct current (DC) overvoltage monitoring and protection device includes an overvoltage sensor operably connected to an electrical power input line. The overvoltage sensor is configured to change state upon detection of a voltage over a preselected threshold. An overvoltage relay is operably connected to the overvoltage sensor. The overvoltage relay includes one or more relay switches configured to move between a first position and a second position when the voltage over the preselected threshold is detected. An independent relay power source is operably connected to the overvoltage relay to provide electrical power to the overvoltage relay, separate from the electrical power being monitored via the electrical power input line.

17 Claims, 3 Drawing Sheets

(56) References Cited

U.S. PATENT DOCUMENTS

| | | |
|---|---|---|
| 9,450,396 B2 | 9/2016 | Sarrus et al. |
| 9,640,976 B2 | 5/2017 | Chambon et al. |
| 9,973,097 B2 | 5/2018 | Wambsganss |
| 2006/0092585 A1 | 5/2006 | Chan et al. |
| 2009/0086396 A1* | 4/2009 | Bax ................. H02H 3/347 |
| | | 361/93.6 |
| 2013/0077201 A1 | 3/2013 | Sagona |
| 2015/0357856 A1* | 12/2015 | Tanabe ................. H02J 7/00 |
| | | 320/163 |

* cited by examiner

DIRECT CURRENT OVER VOLTAGE MONITORING AND PROTECTION

BACKGROUND

Exemplary embodiments pertain to the art of alternating current (AC) and/or direct current (DC) voltage protection control systems.

At present, system voltage controllers require two (2) dissimilar approaches to monitoring and control of overvoltage, which would feed vehicle AC or DC power busses.

Because the dissimilar voltage protection approaches are not to be contained within a single unit or assembly, usually a power control unit, where the control unit protections could be faulted by a common mode event, thus an independent and dissimilar protection is required.

The overvoltage (OV) protection protects against the risk of voltage power having an output voltage high enough to result in user equipment faults or failures.

BRIEF DESCRIPTION

In one embodiment, a direct current (DC) overvoltage monitoring and protection device includes an overvoltage sensor operably connected to an electrical power input line. The overvoltage sensor is configured to change state upon detection of a voltage over a preselected voltage and time threshold. An overvoltage relay is operably connected to the overvoltage sensor. The overvoltage relay includes one or more relay switches configured to move between a first position and a second position when the voltage over the preselected threshold is detected. An independent relay power source is operably connected to the overvoltage relay to provide electrical power to the overvoltage relay, separate from the electrical power being monitored via the electrical power input line.

Additionally or alternatively, in this or other embodiments the first position is a closed position during normal operation, and the second position is an open position when the voltage over the preselected threshold is detected.

Additionally or alternatively, in this or other embodiments when the one or more relay switches are in the open position, the flow of electrical power through the DC overvoltage monitoring and protection device is interrupted, thus causing isolation of an electrical bus.

Additionally or alternatively, in this or other embodiments the one or more relay switches are latched in the open position via the electrical power supplied to the overvoltage relay via the independent relay power source when the voltage over the preselected threshold is detected.

Additionally or alternatively, in this or other embodiments a relay enable/reset switch is operably connected to the overvoltage relay to allow for reset of the one or more relay switches from the second position to the first position.

Additionally or alternatively, in this or other embodiments the overvoltage relay is operably connected to one or more electrical isolation component coil lines to provide electrical path when the one or more relay switches are in the first position.

Additionally or alternatively, in this or other embodiments a relay circuit breaker is operably connected to the relay power source and the overvoltage relay.

In another embodiment, a direct current (DC) electrical system interconnection includes an electrical power input line operably connected to an input direct current DC power source, one or more electrical power output lines operably connected to one or more components to provide electrical power thereto, and a DC overvoltage monitoring and protection device operably connected to the electrical power input line and the electrical power output line. The DC overvoltage monitoring and protection device includes an overvoltage sensor configured to change state upon detection of a voltage over a preselected timing and voltage threshold, and an overvoltage relay operably connected to the overvoltage sensor. The overvoltage relay includes one or more relay switches configured to move between a first position and a second position when the voltage over the preselected threshold is detected. A relay power source is operably connected to the overvoltage relay to provide electrical power to the overvoltage relay, separate from the electrical power being sensed via the electrical power input line.

Additionally or alternatively, in this or other embodiments electrical power is provided to the one or more components when the one or more relay switches are in the first position.

Additionally or alternatively, in this or other embodiments the first position is a closed position during normal operation, and the second position is an open position when the voltage over the preselected threshold is detected.

Additionally or alternatively, in this or other embodiments when the one or more relay switches are in the open position, the flow of electrical power to the one or more components via the through the one or more electrical power output lines.

Additionally or alternatively, in this or other embodiments the one or more relay switches are latched in the open position via the electrical power supplied to the overvoltage relay via the relay power source when the voltage over the preselected threshold is detected.

Additionally or alternatively, in this or other embodiments a relay enable/reset switch is operably connected to the overvoltage relay to allow for reset of the one or more relay switches from the second position to the first position.

Additionally or alternatively, in this or other embodiments the relay enable/reset switch is located at a cockpit of an aircraft.

Additionally or alternatively, in this or other embodiments a relay circuit breaker is operably connected to the relay power source and the overvoltage relay.

Additionally or alternatively, in this or other embodiments the input power source is a transformer rectifier unit.

Additionally or alternatively, in this or other embodiments the DC power source is a transformed rectifier unit (TRU) powered from an AC power source.

Additionally or alternatively, in this or other embodiments the overvoltage protection is engaged based off of AC voltage when sensing DC voltage from a TRU.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
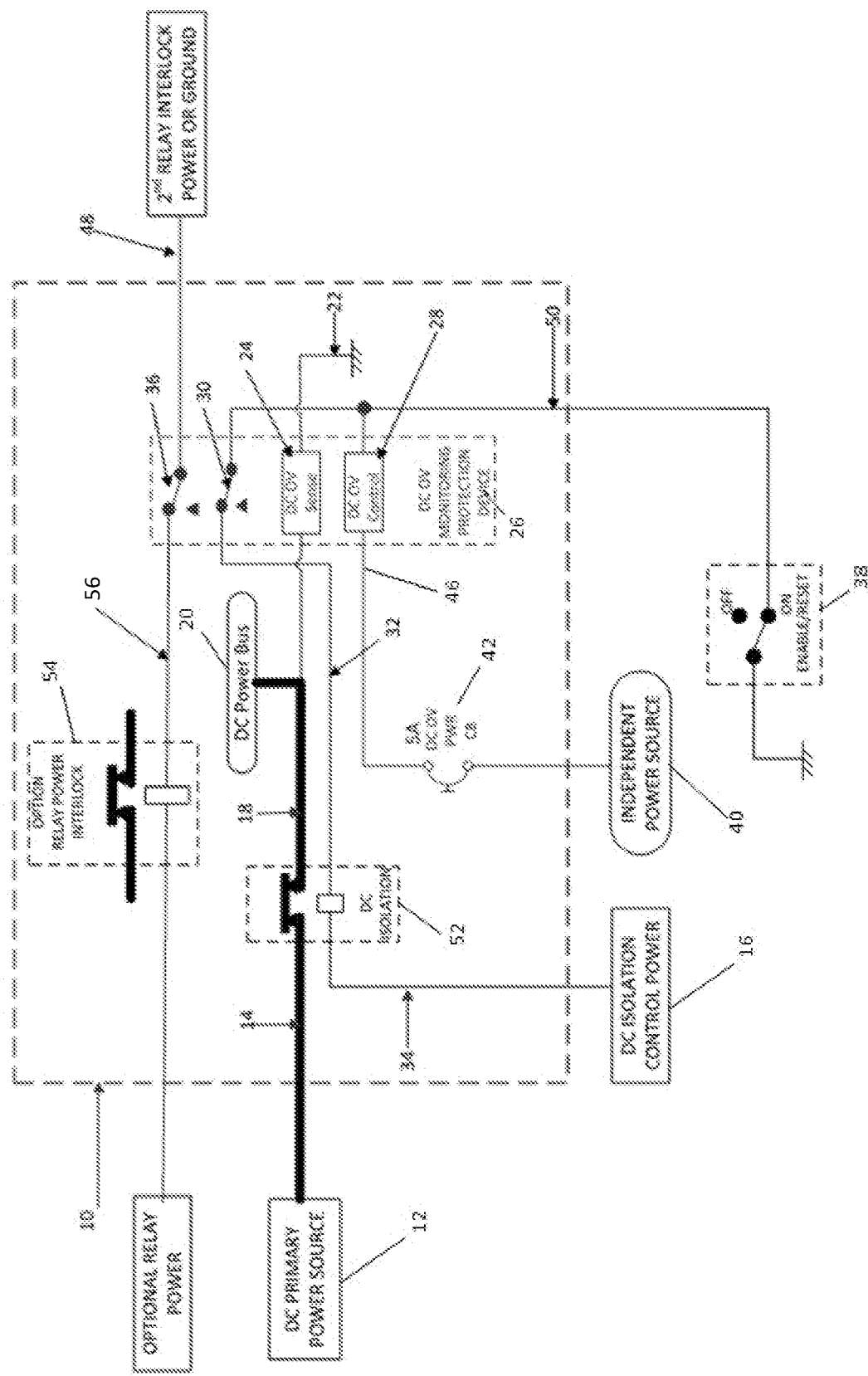
FIG. 1 is a schematic view of an electrical power DC system interconnection with the DC OV component shown in a normal operating state (with no DC OV present)

Referring to FIG. 1, illustrated is a direct current (DC) system interconnection 10. The DC system interconnection 10 is configured to receive electrical power input from a DC primary power source 12 such as, for example, a transformer rectifier unit (TRU) or generator, via an input power line (feeder) 14, and directs the electrical power to a DC isolation component 52, such as a contactor or relay.

The DC isolation component output 52 directs (connects) the DC power to a DC power bus 20 via a DC isolation component output line 18.

The DC system interconnection 10 further includes a direct current DC overvoltage monitoring and protection device 26. The DC overvoltage monitoring and protection device 26 is electrically connected to the DC isolation component output line 18 and is configured to monitor DC voltage at the DC power bus 20 as referenced to ground 22.

The DC overvoltage monitoring and protection device 26 includes a voltage sensor 24. When the DC overvoltage monitoring and protection device 26 is in a normal position, as shown in FIG. 1, a ground is provided via switch 30 that allows a coil of the DC isolation device 52 to be energized, sourced from a DC isolation device power 16 through a DC isolation power line 34.

The DC overvoltage monitoring and protection device 26 is powered from an independent power source 40, via a relay protection device, such as a thermal circuit breaker (TCB) 42, which is connected to a DC overvoltage controller 28 of the DC overvoltage monitoring and protection device 26. The DC overvoltage monitoring and protection device 26 is not dependent on power via the voltage sensor 24.

The thermal circuit breaker 42, fed by the independent power source 40, is located along a relay power line 46, to protect the incoming relay electrical power along the relay power line 46. In some embodiments, the thermal circuit breaker 42 is a 5 amp circuit breaker, but one skilled in the art will readily appreciate that other circuit breakers 42 may be utilized.

The DC overvoltage monitoring and protection device 26 includes one or more internal relay switches 30 and 36 that, as in the embodiment shown in FIG. 1, are normally closed relay switches. With the relay switches 30 and 36 in the closed position, as shown in FIG. 1, independent electrical power is fed through each of the one or more outputs 48 and 50.

Figure 2:
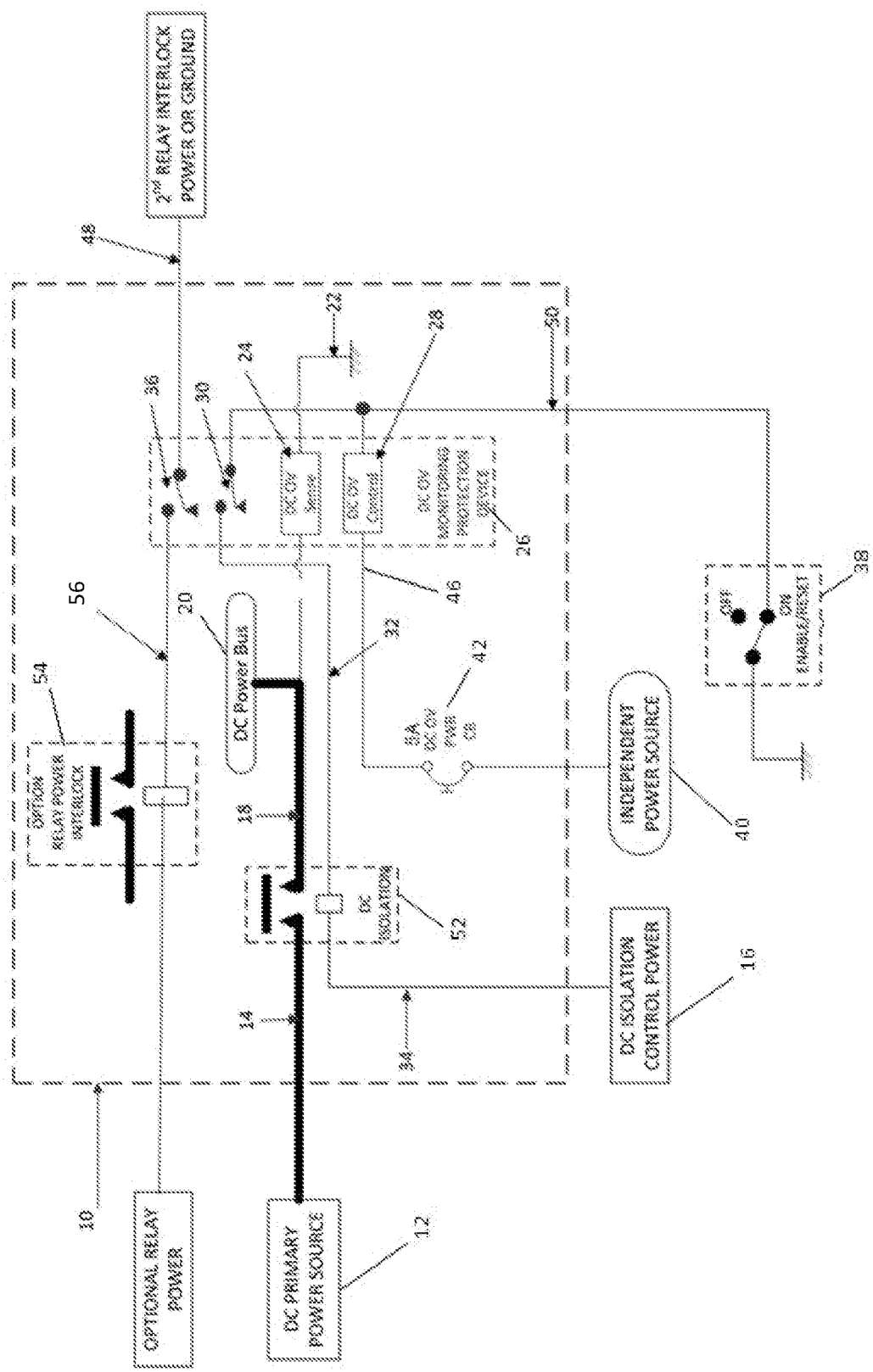
FIG. 2 is a schematic view of an electrical DC system interconnection with the DC OV component shown in a protection engaged (with DC OV present) state.

Referring now to FIG. 2, DC system interconnection 10 is illustrated in a configuration in which a voltage condition exists where DC voltage is greater than the preselected threshold and is detected by the voltage sensor 24. Detection of the over voltage at the voltage sensor 24 causes a change in state of the DC overvoltage monitoring and protection device 26 and opens the relay switches 30 and 36 as shown in FIG. 2. When the relay switches 30 and 36 are in the opened position, stopping the flow of electrical isolation component electrical coil power 32 and 56 along the one or more power output lines 48 and 50. By opening switches 30 and 36, the DC isolation component 52 and an optional interlock relay 54 are opened.

This diversion opening of the DC isolation component 52 protects the components connected to the DC Power Bus 20 from damage due to the overvoltage condition.

The DC overvoltage monitoring and protection device 26 is operably connected to an enable/reset switch 38, which may be located remotely from the DC system interconnection 10 at, for example, a cockpit of an aircraft. Since when the DC overvoltage monitoring and protection device 26 is tripped by the voltage sensor 24 the DC overvoltage monitoring and protection device 26 maintains its electrical power via the independent power line 46, the DC overvoltage monitoring and protection device 26 can be maintained in a latched open, or tripped, position to ensure the DC overvoltage monitoring and protection device 26 does not inadvertently reset without a manual operation. Such a manual reset of the DC overvoltage monitoring and protection device 26 is provided at the enable/reset switch 38. In the illustration of FIG. 1 and FIG. 2, the enable/reset switch 38 is shown in the "on" positon, meaning that the DC overvoltage monitoring and protection device 26 has been enabled.

Figure 3:
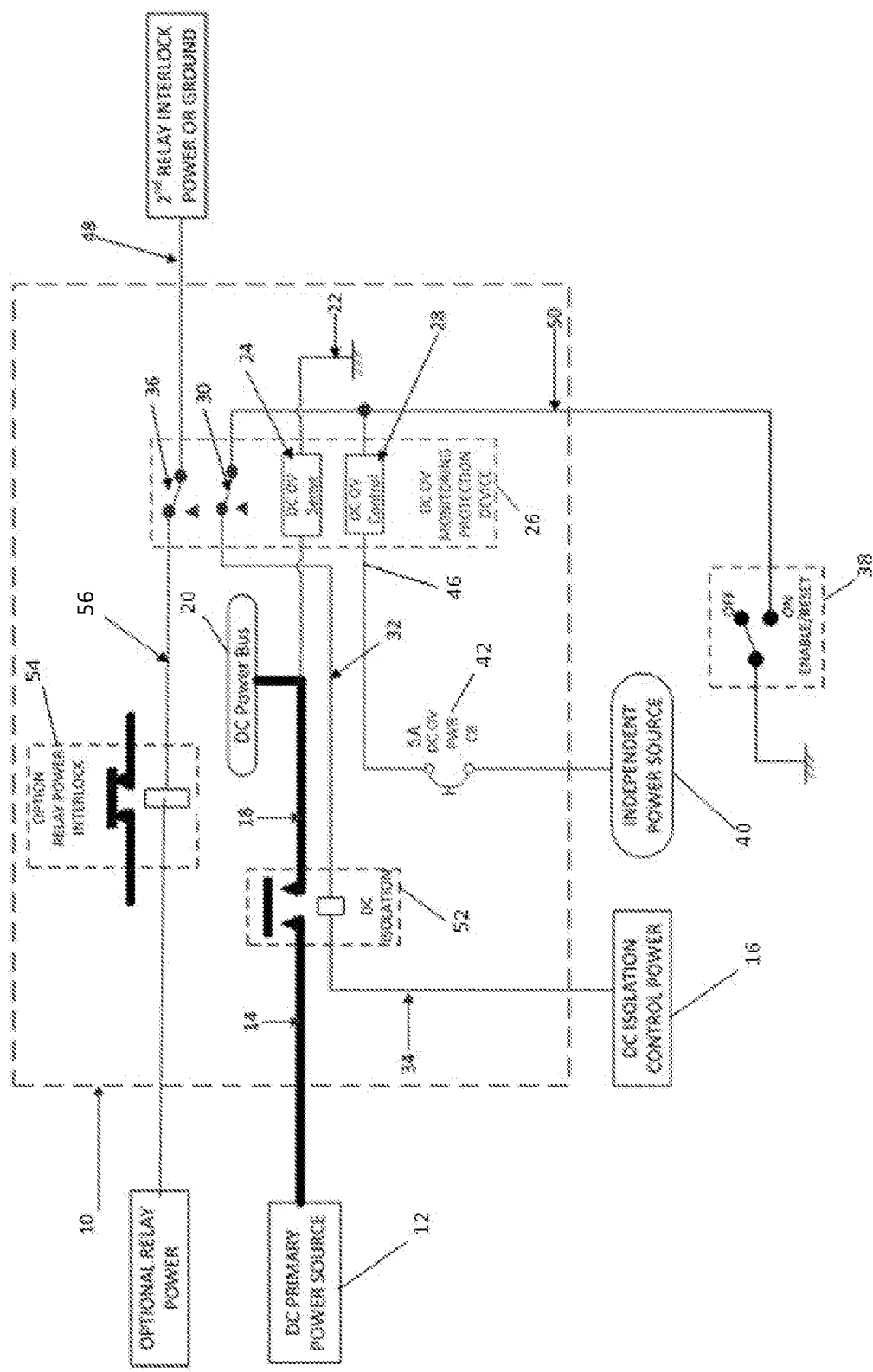
FIG. 3 is a schematic view of an electrical DC system interconnection with the DC OV component shown in a protection reset (with DC OV protection disabled) state.

When the enable/reset switch 38 is moved to an "off" position, such as shown in FIG. 3, the DC overvoltage monitoring and protection device 26 is reset, moving the relay switches 30 and 36 back to their normally closed positions as shown. Further, the voltage control 28 is unpowered. In some embodiments, the enable/reset switch 38 is manually operated by a pilot or other aircraft personnel at the cockpit. Alternatively, the DC overvoltage monitoring and protection device 26 is reset by powering down the independent power source 40.

The DC overvoltage monitoring and protection device 26 can be set for limits of voltage and time depending on the system architecture and be independent of other electrical power system controllers, to support dissimilar implementation of control and protection. The implementation of the DC overvoltage monitoring and protection device 26 can be done in analog circuits or via a software defined curve for voltage vs time trip curve as required for DC system voltage and loading.

Power for control and protection would be either DC power from monitoring and then the protection condition that stays in the latched (active) condition mechanically or from a separate (independent) DC power source and the protection condition stays in the latched condition by electrical power from the separate DC power source to prevent uncontrolled release of the DC overvoltage monitoring and protection device 26.

The protection reset can be done by external operator action via, for example, the external enable/reset switch 38, or by system control, independent of the DC overvoltage monitoring and protection device 26. External operation action can be by ground/open or ground/28V reset signal, but is dissimilar from the DC overvoltage monitoring and protection device 26. Further, the DC overvoltage monitoring and protection device 26 can be configured as a module that is designed and installed into existing systems with minimal disruption of existing controllers or vehicle wiring.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A direct current (DC) overvoltage monitoring and protection device, comprising:
    an overvoltage sensor operably connected to an electrical power input line, the overvoltage sensor configured to change state upon detection of a voltage over a preselected voltage and timing threshold;
    an overvoltage relay operably connected to the overvoltage sensor, the overvoltage relay including one or more relay switches configured to move between a first position and a second position when the voltage over the preselected threshold is detected; and
    an independent relay power source operably connected to the overvoltage relay to provide electrical power to the overvoltage relay, separate from the electrical power being monitored via the electrical power input line, the independent relay power source operably connected to the overvoltage relay via a thermal circuit breaker;
    wherein the overvoltage protection is engaged based off of AC voltage when sensing DC voltage from a transformed rectifier unit (TRU).

2. The DC overvoltage monitoring and protection device of claim 1, wherein the first position is a closed position during normal operation, and the second position is an open position when the voltage over the preselected threshold is detected.

3. The DC overvoltage monitoring and protection device of claim 2, wherein when the one or more relay switches are in the open position, the flow of electrical power through the DC overvoltage monitoring and protection device is stopped.

4. The DC overvoltage monitoring and protection device of claim 2, wherein the one or more relay switches are latched in the open position via the electrical power supplied to the overvoltage relay via the independent relay power source when the voltage over the preselected threshold is detected.

5. The DC overvoltage monitoring and protection device of claim 1, further comprising a relay enable/reset switch operably connected to the overvoltage relay to allow for reset of the one or more relay switches from the second position to the first position.

6. The DC overvoltage monitoring and protection device of claim 1, wherein the overvoltage relay is operably connected to one or more electrical isolation component coil lines to provide electrical path when the one or more relay switches are in the first position.

7. The DC overvoltage monitoring and protection device of claim 1, further comprising a relay circuit breaker operably connected to the relay power source and the overvoltage relay.

8. A direct current (DC) electrical system interconnection comprising:
    an electrical power input line operably connected to an input direct current (DC) power source;
    one or more electrical power output lines operably connected to one or more components to provide electrical power thereto; and
    a (DC) overvoltage monitoring and protection device operably connected to the electrical power input line and the electrical power output line, comprising:
        an overvoltage sensor configured to change state upon detection of a voltage over a preselected voltage and timing threshold;
        an overvoltage relay operably connected to the overvoltage sensor, the overvoltage relay including one or more relay switches configured to move between a first position and a second position when the voltage over the preselected threshold is detected; and
        a relay power source operably connected to the overvoltage relay to provide electrical power to the overvoltage relay, separate from the electrical power being sensed via the electrical power input line;
    wherein the overvoltage protection is engaged based off of AC voltage when sensing DC voltage from a TRU.

9. The DC system interconnection of claim 8, wherein electrical power is provided to the one or more components when the one or more relay switches are in the first position.

10. The DC system interconnection of claim 8, wherein the first position is a closed position during normal operation, and the second position is an open position when the voltage over the preselected threshold is detected.

11. The DC system interconnection of claim 10, wherein when the one or more relay switches are in the open position, the flow of electrical power to the one or more components via the through the one or more electrical power output lines.

12. The DC system interconnection of claim 10, wherein the one or more relay switches are latched in the open position via the electrical power supplied to the overvoltage relay via the relay power source when the voltage over the preselected threshold is detected.

13. The DC system interconnection of claim 8, further comprising a relay reset switch operably connected to the overvoltage relay to allow for reset of the one or more relay switches from the second position to the first position.

14. The DC system interconnection of claim 13, wherein the relay reset switch is located at a cockpit of an aircraft.

15. The DC system interconnection of claim 8, further comprising a relay circuit breaker operably connected to the relay power source and the overvoltage relay.

16. The DC system interconnection of claim 8, wherein the input power source is a transformer rectifier unit.

17. The DC system interconnection of claim 8, wherein the DC power source is a transformed rectifier unit (TRU) powered from an AC power source.

* * * * *